Dec. 27, 1932.  M. J. GALVIN  1,891,975
PUNCTURE SEALING DEVICE FOR PNEUMATIC TIRES
AND OTHER GAS FILLED CONTAINERS
Filed March 10, 1932
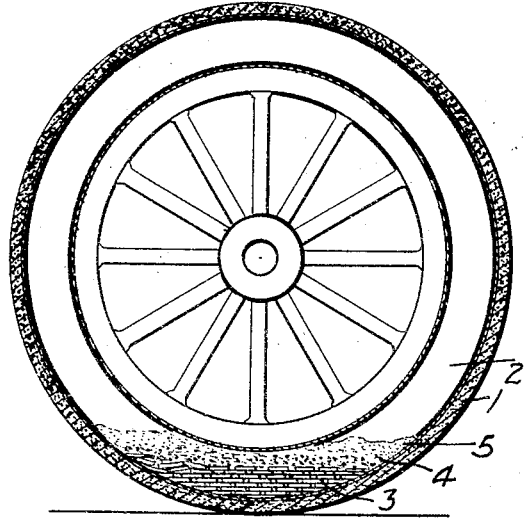
FIG. 1.
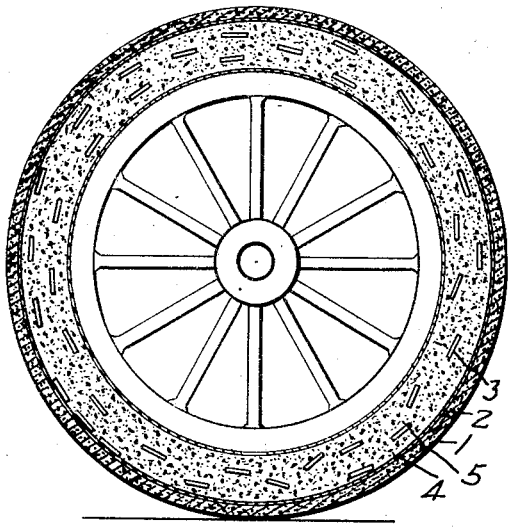
FIG. 2.
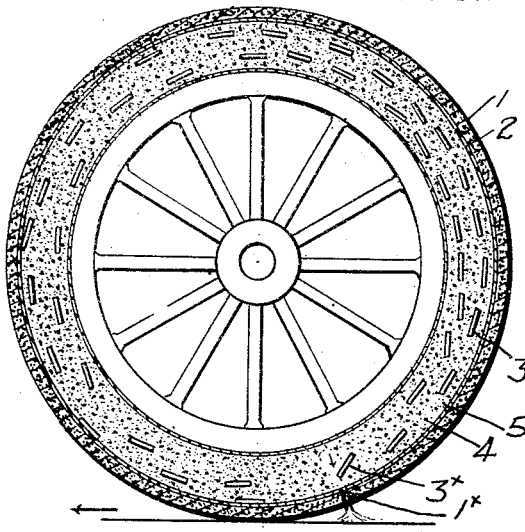
FIG. 3.
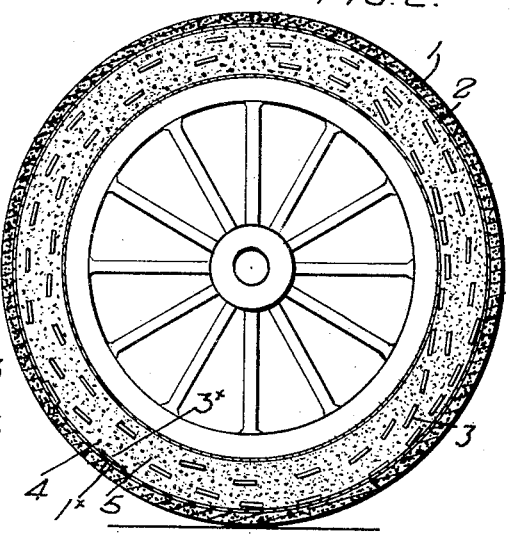
FIG. 4.
FIG. 7.
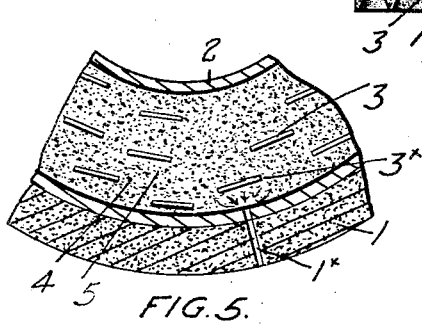
FIG. 5.
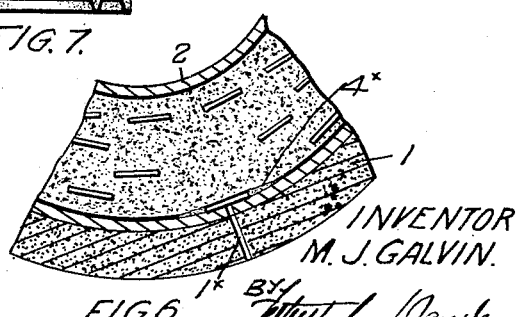
FIG. 6.
INVENTOR
M. J. GALVIN.
BY
ATTORNEYS.

Patented Dec. 27, 1932

1,891,975

UNITED STATES PATENT OFFICE

MICHAEL JOSEPH GALVIN, OF TORONTO, ONTARIO, CANADA, ASSIGNOR OF FORTY-NINE PER CENT TO ARTHUR PRITCHARD REID AND DAVID DUNLOP BENNETT, BOTH OF TORONTO, ONTARIO, CANADA

PUNCTURE SEALING DEVICE FOR PNEUMATIC TIRES AND OTHER GAS FILLED CONTAINERS

Application filed March 10, 1932. Serial No. 598,041.

My invention relates to improvements in puncture sealing devices for pneumatic tires and other gas filled containers, and the object of the invention is to devise simple means whereby a puncture may be automatically sealed immediately after the puncture perforation has been formed and before any noticeable deflation of the tire or other container has occurred, and it consists essentially of the arrangement and construction of parts as hereinafter more particularly explained.

Fig. 1 is a sectional view through a wheel showing the parts in the position they assume when the wheel is at rest.

Fig. 2 is a similar view to Fig. 1 showing the position the parts assume when the wheel is revolving.

Fig. 3 is a similar view to Figs. 1 and 2 showing the puncture perforation formed immediately prior to sealing.

Fig. 4 is a similar view to the previous figures showing the puncture perforation sealed.

Fig. 5 is an enlarged view of a fragment of a tire showing the puncture perforation and one of the sealing discs in the position it assumes immediately prior to sealing.

Fig. 6 is a similar view to Fig. 5 showing the puncture perforation sealed.

Fig. 7 is an enlarged sectional view through one of the discs 3.

In the drawing like characters of reference indicate corresponding parts in each figure.

1 indicates the outer casing of a tire and 2 the inner tube formed in the usual manner. 3 are a multiplicity of light non-porous discs which lie freely within the inner tube together with a quantity of a mineral powder mixture consisting of a coarse cohesive powder such as indicated by the coarse dots 4 and a fine non-cohesive powder such as indicated by the fine dots 5.

When the wheel revolves at high speed the discs and powder mixture are distributed around the inner tube in a manner similar to that indicated in Fig. 2 so that there is always a disc in close proximity to any portion of the tire or container wall. The number of discs provided may be such as to fulfill the required conditions.

When a puncture orifice $1^x$ is formed extending through the outer casing 1 and inner tube 2, such perforation is formed in that portion of the tread in contact with the road surface and, as it travels forward clear of the road surface, the wheel travelling in the direction of arrow indicated in Fig. 3, such perforation is left open and a small quantity of the powder contained within the inner tube is blown outward, this condition remaining until the wheel has made one revolution bringing the perforation to the position shown in Fig. 3. It will be understood that when a perforation is formed there is a direct outward current of air through the centre of the perforation and a reflex or eddy current of air around the edges of the perforation produced by the air current rebounding from the surface of the tube wall.

When the wheel is revolved to the position shown in Fig. 3 a disc such as indicated at $3^x$ is drawn into the outward current of air and, as the wheel revolves to carry the perforation below the centre of the wheel, the combined weight of the disc and the outward pull of the air current serves to overcome the reflex air current so as to permit the disc seating itself in contact with the tire wall over the puncture perforation. The placing of the disc in this position serves to block the outward flow of the major portion of the air current but, in order to completely seal the perforation, I provide the powder material indicated by the dots 4 and 5, the coarse material packing around the edges of the disc as clearly indicated at $4^x$ in Fig. 6, the finer powder packing on top of the coarser as to seal any fine air leak which may be produced through the coarse powder thereby making a complete seal.

It will be readily understood that when the disc is so placed the outward pressure of the air within the tire will hold such disc in place so that there will be no possibility of an air leak through the puncture orifice.

Although I have described my invention as more particularly applied to tires it will of course be understood that there are many other forms of gas filled containers to which my invention may be equally well applied.

Although I have described my device as applied to the stoppage of a gas leak particularly air, it might also be applied to the stoppage of liquid fluid leaks such as those which occur in the bottom of gasoline tanks.

If desired each disc may be provided on both its faces with annular concentric ribs $3^0$ and $3^1$ forming an annular interspace which, when the disc is against the surface to be sealed, forms vacuum or suction spaces, one of such spaces which is between the ribs being annular and the other within the inner rib being circular. When the disc is carried to the sealing position, should the puncture perforation be opposite the central portion of the disc that is within the annular rib $3^1$ when the disc is pressed into contact with the tube wall, a vacuum is formed in the interspace between the ribs $3^0$ and $3^1$ when the pressure is momentarily relieved when jarred as the wheel travels over the road surface.

Similarly if the puncture perforation is opposite the annular interspace between the ribs $3^0$ and $3^1$, a suction action is formed in the space within the rib $3^1$ and yet have the same effect to hold the disc in place when jarred.

What I claim as my invention is:

The combination with a puncturable fluid container, of a multiplicity of discs each face of each disc being provided with annular concentric ribs spaced apart to form an annular suction or vacuum interspace to hold the disc over the puncture perforation when in contact with the tube wall and under slightly varying pressure.

MICHAEL JOSEPH GALVIN.